US012719893B2

(12) United States Patent
Radi et al.

(10) Patent No.: US 12,719,893 B2
(45) Date of Patent: Aug. 25, 2026

(54) DETECTION OF MALICIOUS OPERATIONS FOR DISTRIBUTED CACHE

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 273 days.

(21) Appl. No.: 17/683,737

(22) Filed: Mar. 1, 2022

(65) Prior Publication Data

US 2023/0283618 A1 Sep. 7, 2023

(51) Int. Cl.
*H04L 9/40* (2022.01)

(52) U.S. Cl.
CPC ................................ *H04L 63/1425* (2013.01)

(58) Field of Classification Search
CPC ..... H04L 63/1425; H04L 63/14; H04L 9/002; G06F 3/0679; G06F 8/4442; G06F 21/56; G06F 12/0893; G06F 12/0895; G06F 12/0871; G06F 12/0877
USPC ............................................... 726/23, 22, 24
See application file for complete search history.

(56) References Cited

U.S. PATENT DOCUMENTS 6,151,618 A * 11/2000 Wahbe ................ G06F 11/3624 717/124
6,381,686 B1 * 4/2002 Imamura ............ G06F 12/0811 711/E12.024
7,631,160 B2 * 12/2009 Strongin ............ G06F 12/1483 713/193
8,412,907 B1 4/2013 Dunshea et al.
8,700,727 B1 4/2014 Gole et al.
10,027,697 B1 * 7/2018 Babun ................ H04L 63/1425
10,362,149 B2 7/2019 Biederman et al.
10,530,711 B2 1/2020 Yu et al.
10,628,560 B1 * 4/2020 Siranni ............... G06F 21/6281
10,706,147 B1 * 7/2020 Pohlack .............. H04L 63/1416
10,754,707 B2 8/2020 Tamir et al.
(Continued)

FOREIGN PATENT DOCUMENTS

CN 106603409 A 4/2017
CN 112351250 A 2/2021
(Continued)

OTHER PUBLICATIONS maefeichen.com; "Setup the extended Berkeley Packet Filter (eBPF) Environment"; Maofei's Blog; Dec. 9, 2021; available at: https://maofeichen.com/setup-the-extended-berkeley-packet-filter-ebpf-environment/.
(Continued)

*Primary Examiner* — Kaylee J Huang
(74) *Attorney, Agent, or Firm* — Barry IP Law, P.C.

(57) ABSTRACT

A node includes a memory configured to be used at least in part as a shared cache in a distributed cache. A network interface of the node is configured to communicate with one or more other nodes in a network. Each of the one or more other nodes is configured to provide a respective shared cache for the distributed cache. At least one processor of the node is configured to execute a kernel of an Operating System (OS) for allocating resources of the node. The kernel is used to collect cache access information for the shared cache for identifying malicious operations in the distributed cache.

21 Claims, 5 Drawing Sheets

(56) References Cited

U.S. PATENT DOCUMENTS

| | | | | |
|---|---|---|---|---|
| 10,757,021 | B2 | 8/2020 | Man et al. | |
| 11,134,025 | B2 | 9/2021 | Billore et al. | |
| 11,223,579 | B2 | 1/2022 | Lu | |
| 2002/0143843 | A1* | 10/2002 | Mehta | G06F 9/4881 718/103 |
| 2005/0257263 | A1* | 11/2005 | Keohane | H04L 63/145 726/22 |
| 2006/0101466 | A1* | 5/2006 | Kawachiya | G06F 9/46 718/100 |
| 2007/0067840 | A1* | 3/2007 | Young | G06F 21/72 726/22 |
| 2008/0077994 | A1* | 3/2008 | Comlekoglu | G06F 21/53 713/176 |
| 2009/0249357 | A1* | 10/2009 | Chanda | G06F 9/546 719/314 |
| 2010/0161976 | A1* | 6/2010 | Bacher | G06F 12/1009 711/130 |
| 2011/0126269 | A1 | 5/2011 | Youngworth | |
| 2012/0198192 | A1* | 8/2012 | Balasubramanian | G06F 12/0246 711/163 |
| 2012/0207026 | A1 | 8/2012 | Sato | |
| 2012/0255003 | A1* | 10/2012 | Sallam | G06F 21/554 726/23 |
| 2014/0143365 | A1 | 5/2014 | Guerin et al. | |
| 2014/0283058 | A1* | 9/2014 | Gupta | G06F 21/562 726/23 |
| 2015/0006663 | A1 | 1/2015 | Huang | |
| 2015/0319237 | A1 | 11/2015 | Hussain et al. | |
| 2015/0331622 | A1* | 11/2015 | Chiu | G06F 3/0619 711/102 |
| 2017/0163479 | A1 | 6/2017 | Wang et al. | |
| 2017/0269991 | A1 | 9/2017 | Bazarsky et al. | |
| 2018/0004456 | A1* | 1/2018 | Talwar | G06F 3/0611 |
| 2018/0012020 | A1* | 1/2018 | Prvulovic | G06F 21/552 |
| 2018/0032423 | A1* | 2/2018 | Bull | G06F 11/3636 |
| 2018/0173555 | A1* | 6/2018 | Lutas | G06F 21/53 |
| 2018/0191632 | A1 | 7/2018 | Biederman et al. | |
| 2018/0341419 | A1 | 11/2018 | Wang et al. | |
| 2018/0357176 | A1 | 12/2018 | Wang | |
| 2019/0227936 | A1 | 7/2019 | Jang | |
| 2019/0280964 | A1 | 9/2019 | Michael et al. | |
| 2020/0034538 | A1* | 1/2020 | Woodward | G06F 12/0842 |
| 2020/0201775 | A1 | 6/2020 | Zhang et al. | |
| 2020/0274952 | A1 | 8/2020 | Waskiewicz et al. | |
| 2020/0285591 | A1 | 9/2020 | Luo et al. | |
| 2020/0322287 | A1 | 10/2020 | Connor et al. | |
| 2020/0351370 | A1* | 11/2020 | Radi | G06F 12/0828 |
| 2020/0403905 | A1 | 12/2020 | Allen et al. | |
| 2020/0409821 | A1* | 12/2020 | Terada | G06F 9/45558 |
| 2021/0019197 | A1 | 1/2021 | Tamir et al. | |
| 2021/0058424 | A1 | 2/2021 | Chang et al. | |
| 2021/0103505 | A1 | 4/2021 | Tsuchiya | |
| 2021/0149763 | A1 | 5/2021 | Ranganathan et al. | |
| 2021/0157740 | A1* | 5/2021 | Benhanokh | G06F 12/0877 |
| 2021/0240621 | A1 | 8/2021 | Fu et al. | |
| 2021/0266253 | A1 | 8/2021 | He et al. | |
| 2021/0320881 | A1 | 10/2021 | Coyle et al. | |
| 2021/0377150 | A1* | 12/2021 | Dugast | H04L 45/74 |
| 2022/0035698 | A1 | 2/2022 | Vankamamidi et al. | |
| 2022/0121362 | A1 | 4/2022 | Liu et al. | |
| 2022/0294883 | A1 | 9/2022 | Pope et al. | |
| 2022/0350516 | A1 | 11/2022 | Bono et al. | |
| 2022/0357886 | A1 | 11/2022 | Pitchumani et al. | |
| 2022/0414968 | A1* | 12/2022 | Wiegert | G06F 11/2236 |

FOREIGN PATENT DOCUMENTS

| | | | |
|---|---|---|---|
| EP | 3358456 | A1 | 8/2018 |
| EP | 3598309 | B1 | 5/2022 |
| KR | 1020190090331 | A | 8/2019 |
| WO | 2018086569 | A1 | 5/2018 |
| WO | 2018145725 | A1 | 8/2018 |
| WO | 2021226948 | A1 | 11/2021 |

OTHER PUBLICATIONS

International Search Report and Written Opinion dated Oct. 25, 2022 from International Application No. PCT/US2022/030414, 11 pages.

Kang et al.; "Enabling Cost-effective Data Processing with Smart SSD"; 2013 IEEE 29th Symposium on Mass Storage Systems and Technologies (MSST); available at: https://pages.cs.wisc.edu/~yxy/cs839-s20/papers/SmartSSD2.pdf.

Bachl et al.; "A flow-based IDS using Machine Learning in EBPF"; Cornell University; Feb. 19, 2021; available at https://arxiv.org/abs/2102.09980.

Caviglione et al.; "Kernel-level tracing for detecting stegomalware and covert channels in Linux environments"; Computer Networks 191; Mar. 2021; available at: https://www.researchgate.net/publication/350182568_Kernel-level_tracing_for_detecting_stegomalware_and_covert_channels_in_Linux_environments.

Dimolianis et al.; "Signature-Based Traffic Classification and Mitigation for DDoS Attacks Using Programmable Network Data Planes"; IEEE Access; Jul. 7, 2021; available at: https://ieeexplore.ieee.org/stamp/stamp.jsp?arnumber=9511420.

Jun Li; "Efficient Erasure Coding In Distributed Storage Systems"; A thesis submitted in conformity with the requirements for the degree of Doctor of Philosophy Graduate Department of Electrical and Computer Engineering, University of Toronto; Nov. 2017; available at: https://tspace.library.utoronto.ca/bitstream/1807/80700/1/Li_Jun_201711_PhD_thesis.pdf.

Lakshmi J. Mohan; "Erasure codes for optimal performance in geographically distributed storage systems"; Apr. 2018; School of Computing and Information Systems, University of Melbourne; available at: https://minerva-access.unimelb.edu.au/handle/11343/215919.

Navarre et al.; "SRv6-FEC: Bringing Forward Erasure Correction to IPv6 Segment Routing"; SIGCOMM '21: Proceedings of the SIGCOMM '21 Poster and Demo Sessions; Aug. 2021; pp. 45-47; available at: https://dl.acm.org/doi/10.1145/3472716.3472863.

Van Schaik et al.; "RIDL: Rogue In-Flight Data Load"; Proceedings—IEEE Symposium on Security and Privacy; May 2019; available at: https://mdsattacks.com/files/ridl.pdf.

Xhonneux et al.; "Flexible failure detection and fast reroute using eBPF and SRv6"; 2018 14th International Conference on Network and Service Management (CNSM); Nov. 2018; available at: https://dl.ifip.org/db/conf/cnsm/cnsm2018/1570493610.pdf.

Zhong et al.; "Revisiting Swapping in User-space with Lightweight Threading"; arXiv:2107.13848v1; Jul. 29, 2021; available at: https://deepai.org/publication/revisiting-swapping-in-user-space-with-lightweight-threading.

Baidya et al.; "eBPF-based Content and Computation-aware Communication for Real-time Edge Computing"; IEEE International Conference on Computer Communications (INFOCOM Workshops); May 8, 2018; available at https://arxiv.org/abs/1805.02797.

Barbalace et al.; "blockNDP: Block-storage Near Data Processing"; University of Edinburgh, Huawei Dresden Research Center, Huawei Munich Research Center, TUM; Dec. 2020; 8 pages; available at https://dl.acm.org/doi/10.1145/3429357.3430519.

Blin et al.; "Toward an in-kernel high performance key-value store implementation"; Oct. 2019; 38th Symposium on Reliable Distributed Systems (SRDS); available at: https://ieeexplore.ieee.org/document/9049596.

Enberg et al.; "Partition-Aware Packet Steering Using XDP and eBPF for Improving Application-Level Parallelism"; ENCP; Dec. 9, 2019; 7 pages; available at: https://penberg.org/papers/xdp-steering-encp19.pdf.

Kicinski et al.; "eBPF Hardware Offload to SmartNICs: cls_bpf and XDP"; Netronome Systems Cambridge, United Kingdom; 2016; 6 pages; available at https://www.netronome.com/media/documents/eBPF_HW_OFFLOAD_HNiMne8_2_. pdf.

(56) References Cited

OTHER PUBLICATIONS

Kourtis et al.; "Safe and Efficient Remote Application Code Execution on Disaggregated NVM Storage with eBPF"; Feb. 25, 2020; 8 pages; available at https://arxiv.org/abs/2002.11528.
Wu et al.; " BPF for storage: an exokernel-inspired approach"; Columbia University, University of Utah, VMware Research; Feb. 25, 2021; 8 pages; available at: https://sigops.org/s/conferences/hotos/2021/papers/hotos21-s07-zhong.pdf.
Pending U.S. Appl. No. 17/561,898, filed Dec. 24, 2021, entitled "In-Kernel Caching for Distributed Cache", Marjan Radi.
Pending U.S. Appl. No. 17/571,922, filed Jan. 10, 2022, entitled "Computational Acceleration for Distributed Cache", Marjan Radi.
Pending U.S. Appl. No. 17/665,330, filed Feb. 4, 2022, entitled "Error Detection and Data Recovery for Distributed Cache", Marjan Radi.
Sabella et al.; "Using eBPF for network traffic analysis"; available at: Year: 2018; https://www.ntop.org/wp-content/uploads/2018/10/Sabella.pdf.
Ghigoff et al., "BMC: Accelerating Memcached using Safe In-kernel Caching and Pre-stack Processing"; In: 18th USENIX Symposium on Networked Systems Design and Implementation (NSDI 2021); p. 487-501; Apr. 14, 2021.
International Search Report and Written Opinion dated Sep. 30, 2022 from International Application No. PCT/US2022/029527, 9 pages.
Anderson et al.; "Assise: Performance and Availability via Client-local NVM in a Distributed File System"; the 14th USENIX Symposium on Operating Systems Design and Implementation; Nov. 6, 2020; available at: https://www.usenix.org/conference/osdi20/presentation/anderson.
Pinto et al.; "Hoard: A Distributed Data Caching System to Accelerate Deep Learning Training on the Cloud"; arXiv; Dec. 3, 2018; available at: https://arxiv.org/pdf/1812.00669.pdf.
International Search Report and Written Opinion dated Oct. 7, 2022 from International Application No. PCT/US2022/030044, 10 pages.
Bijlani et al.; "Extension Framework for File Systems in User space"; Jul. 2019; Usenix; available at: https://www.usenix.org/conference/atc19/presentation/bijlani.
Brad Fitzpatrick; "Distributed Caching with Memcached"; Aug. 1, 2004; Linux Journal; available at: https://www.inuxjournal.com/article/7451.
Roderick W. Smith; "The Definitive Guide to Samba 3"; 2004; APress Media; pp. 332-336; available at: https://link.springer.com/book/10.1007/978-1-4302-0683-5.
Wu et al.; "NCA: Accelerating Network Caching with express Data Path"; Nov. 2021; IEEE; available at https://ieeexplore.ieee.org/abstract/document/9680837.
Patterson et al.; "Computer Architecture: A Quantitative Approach"; 1996; Morgan Kaufmann; 2nd ed.; pp. 378-380.
International Search Report and Written Opinion dated Nov. 18, 2022 from International Application No. PCT/US2022/030437, 10 pages.
Gao et al.; "OVS-CAB: Efficient rule-caching for Open vSwitch hardware offloading", Computer Networks; Apr. 2021; available at:https://www.sciencedirect.com/science/article/abs/pii/S1389128621000244.
Pfaff et al.; "The Design and Implementation of Open vSwitch"; Usenix; May 4, 2015; available at: https://www.usenix.org/conference/nsdi15/technical-sessions/presentation/pfaff.
Pending U.S. Appl. No. 17/836,927, filed Jun. 9, 2022 entitled "Resource Allocation in Virtualized Environments", Marjan Radi.
Pending U.S. Appl. No. 17/850,767, filed Jun. 27, 2022 entitled "Memory Coherence in Virtualized Environments", Marjan Radi.
Tu et al.; "Bringing the Power of eBPF to Open vSwitch"; Linux Plumber 2018; available at: http://vger.kernel.org/pc_net2018_talks/ovs-ebpf-afxdp.pdf.
Pending U.S. Appl. No. 17/741,244, filed May 10, 2022, entitled "In-Kernel Cache Request Queuing for Distributed Cache", Marjan Radi.
Pending U.S. Appl. No. 17/829,712, filed Jun. 1, 2022, entitled "Context-Aware NVMe Processing in Virtualized Environments", Marjan Radi.

* cited by examiner

20

| Process ID | Cache Miss Ratio | Page Faults | Branch Prediction Misses |
| --- | --- | --- | --- |
| A | 5% | 3 | 14 |
| B | 4% | 6 | 26 |
| C | 98% | 115 | 2,910 |
| D | 2% | 2 | 11 |
| ⋮ | ⋮ | ⋮ | ⋮ |

DETECTION OF MALICIOUS OPERATIONS FOR DISTRIBUTED CACHE

CROSS-REFERENCE TO RELATED APPLICATIONS

This application is related to U.S. application Ser. No. 17/561,898 titled "IN-KERNEL CACHING FOR DISTRIBUTED CACHE", filed on Dec. 24, 2021, which is hereby incorporated by reference in its entirety. This application is also related to U.S. application Ser. No. 17/571,922 titled "COMPUTATIONAL ACCELERATION FOR DISTRIBUTED CACHE", filed on Jan. 10, 2022, which is hereby incorporated by reference in its entirety. This application is also related to U.S. application Ser. No. 17/665,530 titled "ERROR DETECTION AND DATA RECOVERY FOR DISTRIBUTED CACHE", filed on Feb. 4, 2022, which is hereby incorporated by reference in its entirety.

BACKGROUND

Current trends in cloud computing, big data, and Input/Output (I/O) intensive applications, such as real-time or interactive applications, have led to greater needs for high performance distributed memory systems in data centers. Caching is a common technique used to mitigate the latency in accessing data from a storage device. With the emergence of high-speed networking technologies, distributed network-based memory and caching systems can provide a high-capacity memory pool as a shared resource that can provide faster data access compared to disk-based approaches. Distributed caching in data centers can facilitate scalable and efficient memory resource utilization across individual nodes that provide a shared memory for the distributed cache.

Although distributed caching is scalable and reduces an average memory access latency, it can cause security issues by allowing unauthorized memory accesses that can be exploited by malware, such as meltdown or spectre attacks. Applications that share a distributed cache may gain access to random memory locations dedicated to other applications in the distributed cache. Although some operating systems may use techniques to restrict processes by using privileges, such techniques generally cannot ensure the security of a distributed cache against running processes. In addition, identifying malicious memory operations typically requires complex implementations, which makes it difficult to maintain and to apply changes over time based on system requirements or the addition of new shared memories to the distributed cache.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Network Environments

Figure 1:
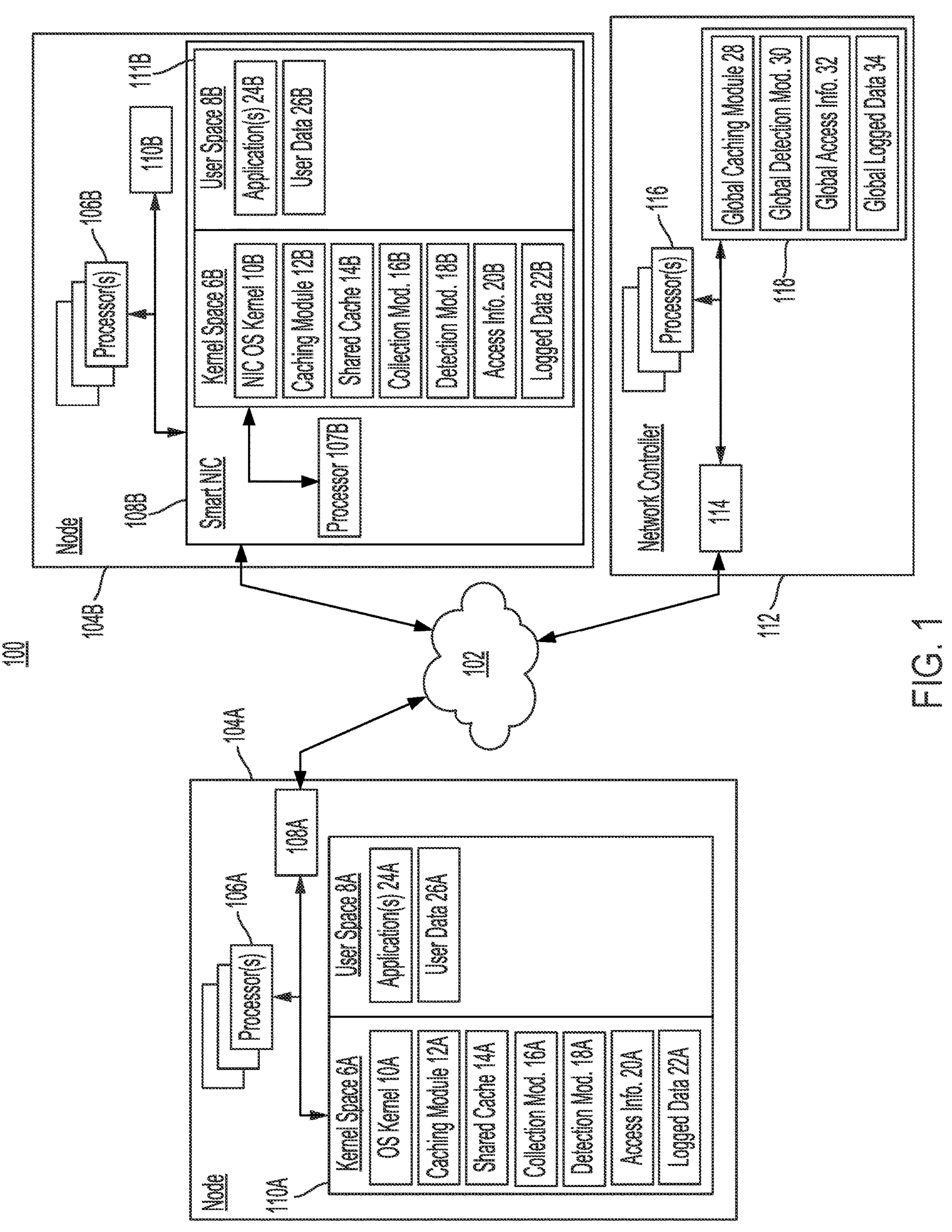
FIG. 1 illustrates an example network environment for implementing the detection of malicious operations for a distributed cache according to one or more embodiments.

FIG. 1 illustrates an example network environment 100 for implementing the detection of malicious operations in a distributed cache according to one or more embodiments. As shown in FIG. 1, nodes 104A and 104B communicate with each other via network 102. In addition, network controller 112 communicates with nodes 104 via network 102. Nodes 104 may function as, for example, servers or processing nodes and/or memory nodes. As a processing node or compute node, a node 104 can include one or more processors 106, such as Reduced Instruction Set Computer (RISC)-V cores or other type of Central Processing Unit (CPU) to process data, such as for a distributed application. As a memory node, a node 104 provides a shared cache 14 that may be accessed by other nodes on network 102 and form part of a distributed cache shared among nodes on network 102.

In some implementations, network environment 100 in FIG. 1 may be used as at least part of a data center and/or for distributed processing, such as for distributed machine learning or big data analysis. As will be appreciated by those of ordinary skill in the art, nodes 104 and network controller 112 are shown for the purposes of illustration, and network environment 100 can include many more nodes 104 than those shown in FIG. 1. In addition, those of ordinary skill the art will appreciate that network environment 100 can include more components than shown in FIG. 1, such as aggregated switches or Top of Rack (ToR) switches, for example.

Network 102 can include, for example, a Storage Area Network (SAN), a Local Area Network (LAN), and/or a Wide Area Network (WAN), such as the Internet. In this regard, nodes 104A and 104B, and/or network controller 112 may not be in the same geographic location. Nodes 104 and network controller 112 may communicate using one or more standards such as, for example, Ethernet.

Each node 104 includes one or more processors 106, a network interface 108, and a memory 110. These components of nodes 104 may communicate with each other via a bus, which can include, for example, a Peripheral Component Interconnect express (PCIe) bus. In some implementations, nodes 104 may include Non-Volatile Memory express over Fabric (NVMeoF) nodes that are configured to communicate with other network devices, such as nodes 104 and network controller 112, using NVMe messages (e.g., NVMe commands and responses) that may be, for example, encapsulated in Ethernet packets using Transmission Control Protocol (TCP). In this regard, network interfaces 108A and 108B of nodes 104A and 104B, respectively, may include Network Interface Cards (NICs) or can include other network interface devices, such as smart NICs, network interface controllers, or network adapters.

Node 104B differs from node 104A in the example of FIG. 1 in that node 104B includes smart NIC 108B with its own processor 107B and memory 111B that are used as a hardware offload from processors 106B for operations related to the distributed cache and the data accessed in shared cache 14B of memory 111B. This arrangement can improve the performance of collecting cache access information and detecting malicious operations by performing these operations closer to the network and can also further free up processing resources and memory for processors 106B of NVMe node 104B.

Processors 106 and 107B in FIG. 1 can execute instructions, such as instructions from one or more applications (e.g., applications 24) or modules (e.g., caching module 12, collection module 16, or detection module 18) loaded from a memory 110 or 111B, or from an Operating System (OS) kernel 10. Processors 106 and 107B can include circuitry such as, for example, a CPU, a Graphics Processing Unit (GPU), a microcontroller, a Digital Signal Processor (DSP), an Application-Specific Integrated Circuit (ASIC), a Field Programmable Gate Array (FPGA), one or more RISC-V cores, hard-wired logic, analog circuitry and/or a combination thereof. In some implementations, processors 106 and 107B can include a System on a Chip (SoC), which may be combined with a memory 110 or 111B, respectively.

Memories 110 and 111B can include, for example, a volatile Random Access Memory (RAM) such as Static RAM (SRAM), Dynamic RAM (DRAM), or a non-volatile RAM, or other solid-state memory that is used by processors 106 or 107B. Data stored in memory 110 or memory 111B can include data read from another node 104, data to be stored in another node 104, instructions loaded from an application or from an OS for execution by the processor, and/or data used in executing such applications, such as user data 22.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 110 or 111B may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

Memories 110A and 111B of nodes 104A and 104B, respectively, include a kernel space 6A or 6B that is used by OS kernel 10A or 10B and a user space 8A or 8B that is used by one or more applications 24, such as for accessing user data 26. Kernel space 6A or 6B and user space 8A or 8B, respectively, can include separate portions of virtual memory mapped to physical addresses in memory 110A or 111B, respectively. As will be understood by those of ordinary skill in the art, access to kernel space 6A or 6B is generally restricted to OS kernel 10A or 10B, respectively, its kernel extensions, and other portions of an OS, such as device drivers, while access to user space 8A or 8B is available to both applications 24 and the OS. In this regard, the OS of node 104A or of smart NIC 108B allocates hardware and software resources, such as memory, network, and processing resources of the device.

As shown in FIG. 1, kernel space 6A or 6B includes caching module 12A or 12B, shared cache 14A or 14B, collection module 16A or 16B, and detection module 18A or 18B. In implementations where the OS of node 104A or smart NIC 108B is Linux, caching module 12A or 12B can include extended Berkeley Packet Filter (eBPF) programs that are executed as an extension of the Linux kernel. Notably, eBPF can enable reprogramming of the kernel behavior without requiring changes to the kernel source code or loading a kernel module. In addition, eBPF includes a verifier to ensure safe execution of eBPF programs.

In the example of FIG. 1, caching module 12A or 12B can enable OS kernel 10A or 10B, respectively, to access data for the distributed cache in shared cache 14A or 14B that is stored in kernel space 6A or 6B, respectively, as opposed to user space 8A or 8B. As discussed in related co-pending application Ser. No. 17/561,898, which is incorporated by reference above, frequently accessed data can be stored in shared cache 14A or 14B using caching module 12A or 12B to accelerate remote memory operations at a nearly line rate without requiring special hardware or changes to the kernel in the case where caching module 12A or 12B is an eBPF program. The remote memory operations, such as read requests and write requests, can be processed at an earlier point in the kernel, as opposed to having to traverse a full network stack and full I/O stack of the kernel to finally be handled by an application in user space 8A or 8B. For example, caching module 12A or 12B may operate at a lower block device driver layer in the I/O stack, without having to pass memory requests through higher layers in the I/O stack, such as a generic block layer and file system layer of the kernel. Similarly, caching module 12A or 12B, collection module 16A or 16B, and detection module 18A or 18B may also operate at a lower network device driver layer in the network stack, without having to pass memory requests through higher layers of the network stack in the kernel, such as a network protocol layer and a socket layer of the kernel.

In this regard, kernel network and I/O stack processing is becoming more of a bottleneck in distributed caches due to faster interface standards, such as NVMeOF, and the increasing bandwidths of network hardware. Caching data for the distributed cache in kernel space 6A or 6B and performing cache access information collection and/or malicious operation detection in kernel space 6A or 6B can enable OS kernel 10A or 10B to perform such operations as compared to performing these operations in user space 8A or 8B. In addition, the in-kernel cache access information collection and/or malicious operation detection of the present disclosure can use one or more kernel extensions, such as eBPF programs, that are added to or injected into the kernel without requiring changes to the kernel source code or reloading a kernel module.

Each of collection module 16A or 16B and detection module 18A or 18B can be executed by OS kernel 10A or 10B, respectively, to collect cache access information and identify malicious operations in shared caches 14A or 14B, respectively. As discussed in more detail below, cache access information can include, for example, one or more of an indication of cache misses (e.g., when requested data is not already stored in the shared cache), an indication of page faults for the shared cache, and an indication of branch prediction misses for the shared cache. The indication of page faults can indicate the frequency or a number of times that a process has attempted to access a memory page that has not been mapped to its virtual address space. The indication of branch prediction misses can indicate that data was fetched from the shared cache based on a misprediction of an execution path in a process' code. The collected cache access information (i.e., access info 20A and 20B in FIG. 1) can be used to identify malicious operations, such as malware, meltdown attacks, or spectre attacks. In some implementations, a kernel performance counter can be used to collect such cache access information, such as by tracking segmentation fault (e.g., SIGSEGV) signals inside the kernel to indicate page faults for the shared cache.

The processes may be executed locally at the node 104 that stores the shared cache 14 or may be executed remotely at a different node or device on network 102. In some implementations, the process can be identified by a process identifier that can be, for example, based on a socket number for the process and a Media Access Control (MAC) address for the network interface of the node executing the process.

Detection modules 18A or 18B can detect malicious operations by analyzing the collected cache access information 20. In some cases, the detection module 18 may determine whether a number of one or more of cache misses, page faults, or branch prediction misses equals or exceeds a threshold value within a predetermined period of time for a particular process accessing the shared cache. Such outliers can indicate a malicious operation attempting to access portions of the shared cache that it should not have access to or an attempt to waste memory or processing resources of the node. In some implementations, detection modules 18 may map or associate one or more accesses to the shared cache by a process to a privilege of the process to the data, such as a shared, exclusive, or read only privilege. For example, a process that attempts to write data to an address for which it only has a read only or shared privilege can indicate a malicious operation.

In some implementations, detection modules 18 can use the kernel to perform system call traces of different processes accessing the shared cache. The system call traces may be used, in some cases, to further investigate a suspicious process to log the data that is being written to or read from the shared cache 14 by the process. The logged data may be stored as logged data 22 in FIG. 1. For example, a malicious operation can include overwriting data stored in the shared cache with null data to erase data stored in the shared cache, or reading data that may have a high value, such as personally identifiable information or banking information.

As with collection modules 16A and 16B discussed above, detection modules 18A and 18B perform operations in kernel spaces 6A and 6B, respectively, as opposed to performing operations in a user space. This ordinarily enables faster identification of malicious operations since data does not need to traverse the full I/O stack and network stack of the kernel and can also conserve the processing and memory resources allocated to applications 24 in the user space. In addition, collection modules 16 and detection modules 18 can take advantage of performance counters that may already be part of the OS kernel, such as tools for tracking cache misses, page faults, or branch prediction misses.

In the example of FIG. 1, shared caches 14A and 14B can be used by caching modules 12A and 12B, respectively, to share data between the kernel space and the user space. In some implementations, shared caches 14 can include one or more eBPF maps that enable copies of data to be provided to applications 24 in user space 8 and to store data from applications 24. Shared caches 14 can include a data structure, such as a Key Value Store (KVS) or a table, for example. The use of an eBPF map as a shared cache can enable different applications 24 in a user space to concurrently access the data stored in the shared cache.

In the example of FIG. 1, network controller 112 can receive cache access information and/or logged data from the nodes 104. This information can be stored in memory 118 of network controller 112 as global access information 32 and global logged data 34, respectively. Global caching module 28 can provide global cache coherency in managing the distributed cache, such as by providing a centralized directory for the data stored in the respective shared caches 14 forming the distributed cache. In addition, global detection module 30 can analyze global access information 32 and/or global logged data 34 to identify malicious operations in the distributed cache. In other implementations, the detection of malicious operations may only occur at the nodes 104 and network controller 112 may only receive notifications of detected malicious operations, rather than both the nodes 104 and network controller 112 analyzing cache access information to identify malicious operations. In yet other implementations, the nodes 104 may not perform any detection or identification of malicious operations, but rather, send cache access information, such as data from access information 20 and logged data 22, to network controller 112 for analysis by global detection module 30. In some implementations, network controller 112 is a Software Defined Networking (SDN) controller.

Processor or processors 116 of network controller 112 can include circuitry such as a CPU, a GPU, a microcontroller, a DSP, an ASIC, an FPGA, hard-wired logic, analog circuitry and/or a combination thereof. In some implementations, processor or processors 116 can include an SoC, which may be combined with one or both of memory 118 and interface 114. Memory 118 can include, for example, a volatile RAM such as DRAM, a non-volatile RAM, or other solid-state memory that is used by processor 116 to store data. Network controller 112 communicates with nodes 104 via interface 114, which may interface according to a standard, such as Ethernet.

Those of ordinary skill in the art will appreciate with reference to the present disclosure that other implementations may include a different number or arrangement of nodes 104 than shown in the example of FIG. 1. In this regard, network environment 100 shown in FIG. 1 is for the purposes of illustration, and those of ordinary skill in the art will appreciate that network environment 100 may include many more nodes 104 and additional components, such as routers and switches, than shown in the example of FIG. 1. In addition, those of ordinary skill in the art will appreciate with reference to the present disclosure that the modules, programs, and data structures shown in FIG. 1 may differ in other implementations. For example, in some implementations, collection module 16 may be combined with detection module 18. As another example variation, a caching module 12 may be combined in some implementations with a collection module 16 and/or detection module 18.

Figures 2, 3:
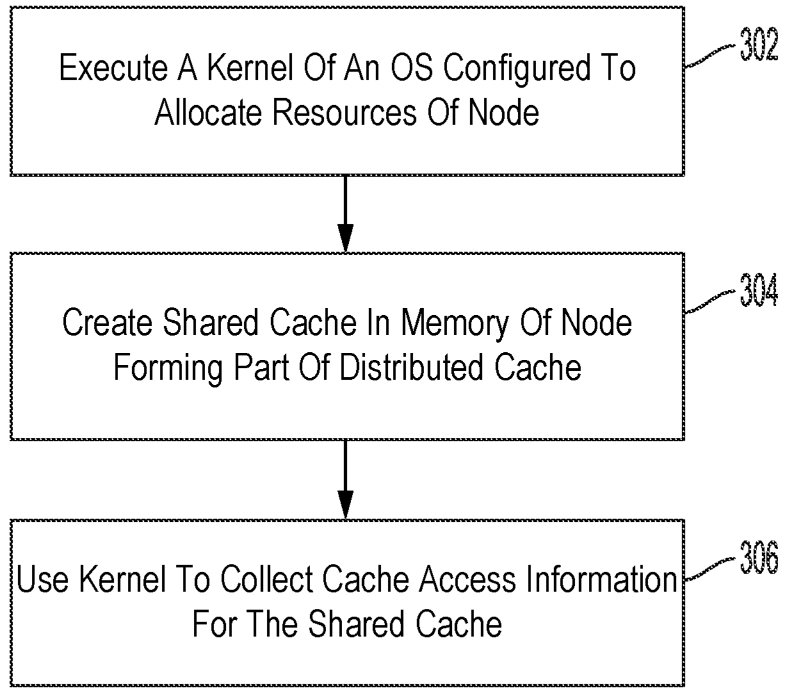
FIG. 2 illustrates an example of cache access information according to one or more embodiments.
FIG. 3 is a flowchart for a cache access information collection process according to one or more embodiments.

FIG. 2 illustrates an example of cache access information 20 according to one or more embodiments. As shown in FIG. 2, cache access information includes a cache miss ratio, a number of page faults, and a number of branch prediction misses for different processes that have accessed a shared cache and are identified by a process identifier. As noted above, the process identifier can be based on a socket number for the process and a MAC address for the network interface of the node executing the process. The cache access information can be collected over a period of time, such as over several hours. In this regard, metrics for processes that are no longer active after a predetermined amount of time may be purged from the cache access information in some implementations.

As discussed above, the cache access information 20 can be collected by a collection module 16 executing at the node 104. In some implementations, the collection module 16 may be a performance tool of the kernel or collection module 16 may make use of metrics tracked by such a performance tool. The cache miss ratio can indicate the ratio of attempted cache accesses by the process out of a total number of cache accesses where data was not already loaded into the shared cache. The number of page faults can indicate number of times that the process has attempted to access a memory page from the shared cache that was not mapped to a virtual address space assigned to the process. Such attempted memory accesses can result in a segmentation fault or SIGSEGV signal that can be counted by collection module 16. The indication of branch prediction misses can indicate that data was fetched from the shared cache or loaded into the shared cache based on a misprediction of an execution path in the process' code. As discussed above, cache access information 20 can be used by detection module 18 and/or global detection module 30 executed by network controller 112 to identify malicious operations in the shared cache 14.

In the example of FIG. 2, processes A, B, and D have a significantly lower cache miss ratio, number of page faults, and branch prediction misses as compared to process C. Detection module 18 executed by node 104 and/or global detection module 30 executed by network controller 112 may determine that one or more of these metrics equal or exceed a threshold value, such that process C is identified as performing malicious operations in the shared cache. In some implementations, detection module 18 may trace read or write system calls by process C to log data that is being written or read from shared cache 14. Detection module 18 or global detection module 30 may then analyze the logged data to determine if the data being written was null data intended to erase data from shared cache 14 or if the data read was sensitive data, such as private information. In addition, detection module 18 or global detection module 30 may compare the privileges that process C has to different data that was accessed or attempted to be accessed in shared cache 14 to determine if process C was trying to read or write data in the shared cache that it did not have a privilege to access.

Those of ordinary skill in the art will appreciate with reference to the present disclosure that other examples of cache access information 20 may differ in other implementations. For example, other implementations may instead include a cache hit ratio or a total count of cache misses over a period of time instead of a cache miss ratio. As another example variation, other implementations of cache access information may not include an indication of branch prediction misses or the cache miss ratio.

Example Processes

FIG. 3 is a flowchart for a cache access information collection process according to one or more embodiments. The process of FIG. 3 may be performed by, for example, a processor 106 of a node 104 or processor 107B of smart NIC 108B in FIG. 1 executing a collection module 16.

In block 302, a kernel of an OS is executed by a processor to allocate resources of a node. In implementations where the processor executes an OS for a smart NIC (e.g., smart NIC 108B in FIG. 1), the processor may use the OS to allocate resources of the smart NIC and the memory or storage that it controls.

In block 304, a shared cache is created in a memory of the node. The shared cache forms part of a distributed cache including respective shared caches stored at other nodes on a network. A network controller (e.g., network controller 112) may control the usage of the distributed cache by different nodes on the network.

In block 306, the processor uses the kernel to collect cache access information for the shared cache. As discussed above, the kernel may include performance tools that may keep track of certain metrics of different processes accessing the shared cache, such as an indication of cache misses, a number of page faults, and/or a number of branch prediction misses. The collected cache access information may be used locally by the node to identify malicious operations in the shared cache or may be sent to a network controller for identifying malicious operations.

Those of ordinary skill in the art will appreciate with reference to the present disclosure that the blocks in other implementations of the cache access information collection process may occur in a different order. For example, those of ordinary skill in the art will understand that the execution of the kernel in block 302 can be concurrent with the creation of the shared cache and the collection of cache access information in blocks 304 and 306.

Figure 4:
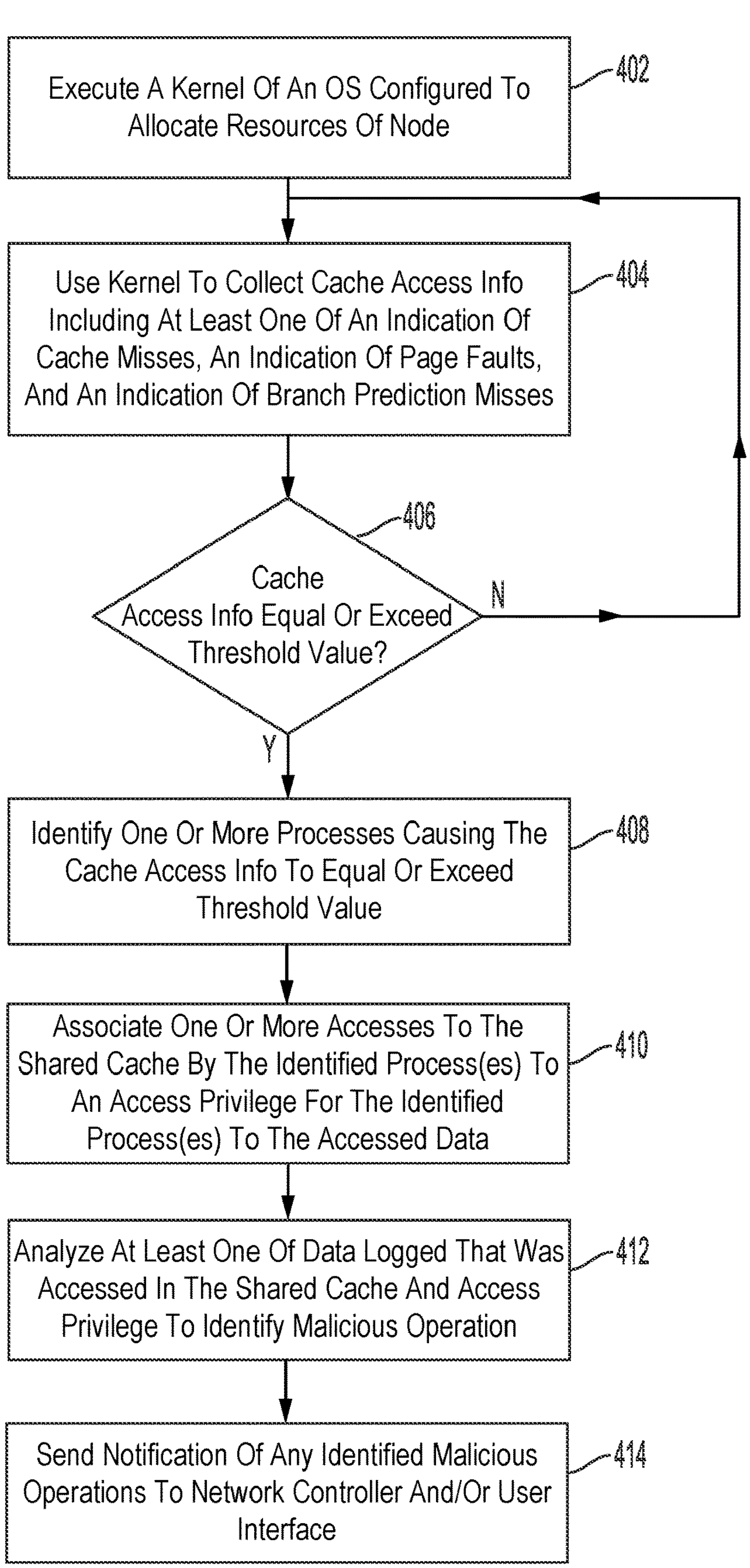
FIG. 4 is a flowchart for a malicious operation detection process performed by a node according to one or more embodiments.

FIG. 4 is a flowchart for a malicious operation detection process performed by a node according to one or more embodiments. The process of FIG. 4 can be performed by, for example, a processor 106 of a node 104 or processor 107B of smart NIC 108B in FIG. 1 executing collection module 16 and detection module 18.

In block 402, a kernel of an OS is executed by a processor to allocate resources of a node. In implementations where the processor executes an OS for a smart NIC (e.g., smart NIC 108B in FIG. 1), the processor may use the OS to allocate resources of the smart NIC and the memory or storage that it controls.

In block 404, the processor uses the kernel to collect cache access information for the shared cache. As discussed above, the kernel may include performance tools that may keep track of certain metrics of different processes accessing the shared cache, such as an indication of cache misses, a number of page faults, and/or a number of branch prediction misses. A collection module may use these performance metrics to associate the metrics with different processes accessing the shared cache.

In block 406, the processor determines whether any of the metrics in the cache access information equal or exceed a threshold value. In some implementations, each cache metric (e.g., cache miss ratio, number of page faults, and number of branch prediction misses) may have its own threshold value. In other implementations, the cache metrics may share a threshold value or there may be only one cache metric considered, such as a number of page faults.

If the cache access information does not meet or exceed a threshold value in block 406, the process returns to block 404 to continue to collect the cache access metrics. In this regard, the collection of cache access information in block 404 may reset after a predetermined period of time.

If the cache access information equals or exceeds a threshold value in block 406, the processor in block 408 identifies one or more processes from the cache access information that has caused the cache access information to equal or exceed the threshold value. In the example process of FIG. 4, the processor continues to investigate the activities of the one or more processes causing the abnormal cache access information. In other implementations, the processor may instead send a notification and/or the cache access information to a network controller, or otherwise notify a user interface (e.g., a system administrator workstation) of the suspected malicious operations being performed by the one or more processes.

In block 410, the processor associates one or more of the accesses by the one or more identified processes with access privileges for the identified process or processes. Access privileges may be kept, for example, in a cache directory for addresses or namespaces for the data accessed in the shared cache or for the distributed cache. The privileges may include, for example, a shared status where multiple processes or applications may have access to read the data but not to modify the data, an exclusive status where the process or application is authorized to modify the data, or a read only status where the process or application can only read the data.

In block 412, the processor analyzes at least one of data that was logged for the identified process or processes in accessing the shared cache and the access privilege or privileges of the identified process or processes to the data accessed in the shared cache. As noted above, after identifying a process as equaling or exceeding a threshold value, a system call trace may be used to record the data being written by the process to the shared cache or being read by the process from the shared cache. The logged data may be stored at the node, such as in logged data 22 in FIG. 1. In other implementations, the processor may log all data that is written to the shared cache or read from the shared cache for a period of time or until a buffer is full.

The processor may also compare the operation performed by the identified process in block 412 to determine if the access privilege for the data matches the operation performed. This information may be included as part of a system call trace. The processer may flag accesses or attempted accesses to the shared cache to, for example, write data to addresses or namespaces for which it may not have any privilege to access or that it only has a read access privilege. As another example, the processor may flag an attempt to read data from the shared cache that the process does not have a privilege to read.

In block 414, a notification is sent to the network controller and/or a user interface, such as a system administrator workstation, if malicious operations are identified as a result of the performance of any of blocks 406 to 412. The notification can include, for example, an identification of the process or application, the time of the unauthorized access, the node executing the process or application, and the information collected for the identified process or processes.

Those of ordinary skill in the art will appreciate with reference to the present disclosure that the blocks in FIG. 4 may differ in other implementations. For example, the association of access privileges in block 410 or the analysis of logged data in block 412 may not be performed in some implementations. As another example, the execution of the kernel in block 402 is understood to run concurrently with the operations performed in blocks 404 through 414. In other implementations, the node may instead send the collected cache access information and/or logged data to a network controller for analysis to identify any malicious operations, as in the example of the cache access information collection process of FIG. 5.

Figure 5:
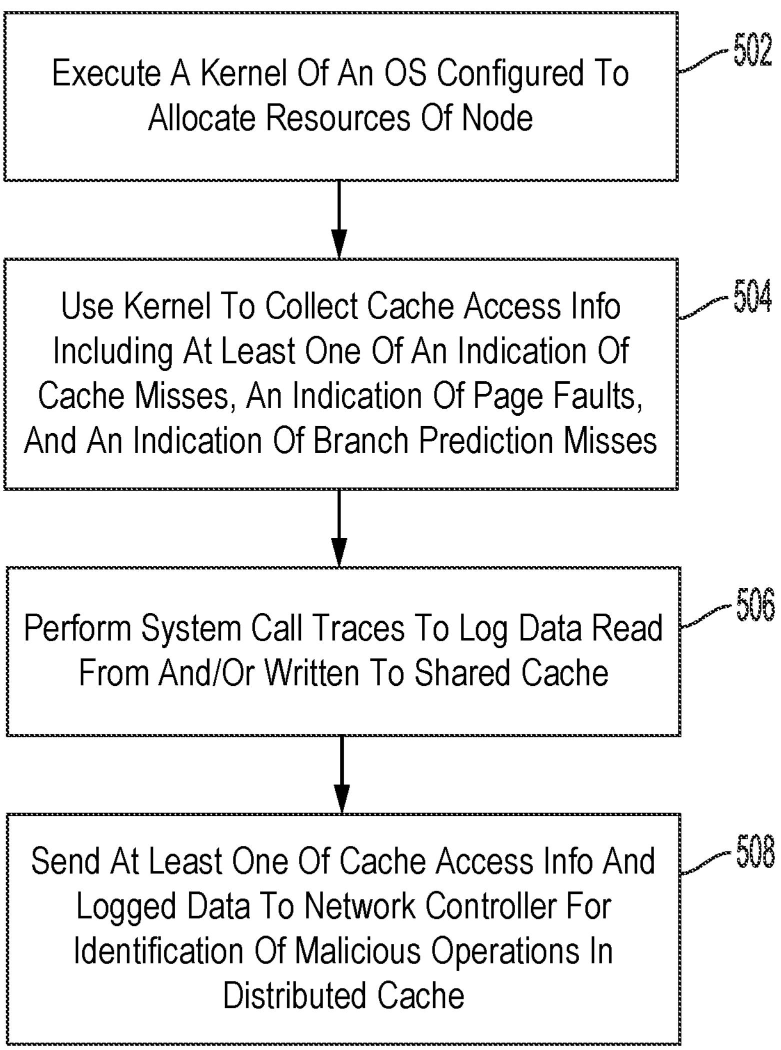
FIG. 5 is a flowchart for a cache access information collection process including the logging of data accessed in a shared cache according to one or more embodiments.

FIG. 5 is a flowchart for a cache access information collection process including the logging of data accessed in a shared cache according to one or more embodiments. The process of FIG. 5 can be performed by, for example, a processor 106 of a node 104 or processor 107B of smart NIC 108B in FIG. 1 executing collection module 16 and detection module 18.

In block 502, a kernel of an OS is executed by a processor to allocate resources of a node. In implementations where the processor executes an OS for a smart NIC (e.g., smart NIC 108B in FIG. 1), the processor may use the OS to allocate resources of the smart NIC and the memory or storage that it controls.

In block 504, the processor uses the kernel to collect cache access information including at least one of an indication of cache misses, an indication of page faults, and an indication of branch prediction misses. As discussed above, the kernel may include performance tools that may keep track of certain metrics of different processes accessing the shared cache, such as an indication of cache misses, a number of page faults, and/or a number of branch prediction misses. A collection module may use these performance metrics to associate the metrics with different processes accessing the cache.

In block 506, the processor may use the collection module to perform system call traces to log data read from and/or written to the shared cache. In some implementations, the processor may log all the accesses to the cache for a predetermined period of time or until a buffer becomes full. In other implementations, the logging may only be performed for processes that have been identified as being suspicious due to the cache access information collected in block 504.

In block 508, the processor sends at least one of the cache access information and the logged data to a network controller for identification of malicious memory operations in the distributed cache. In this regard, the network controller may execute its own global detection module to analyze the information received from multiple nodes, which may enable detection of a coordinated attack from processes executing at different nodes providing shared memory for the distributed cache.

Those of ordinary skill in the art will appreciate with reference to the present disclosure that the blocks for the cache access information collection process of FIG. 5 may differ in other implementations. For example, block 506 may be omitted in some implementations where the logging of data is not performed. In addition, those of ordinary skill in the art will appreciate that the execution of the kernel in block 502 is concurrent with the operations performed in blocks 504 to 508.

Figure 6:
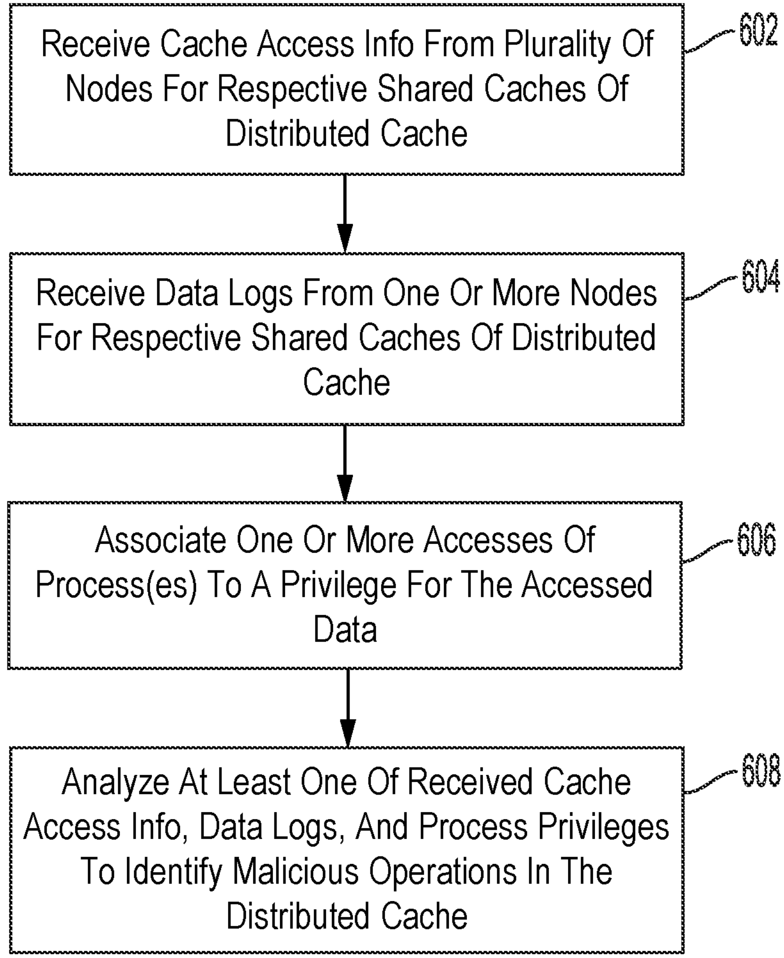
FIG. 6 is a flowchart for a malicious operation detection process performed by a network controller according to one or more embodiments.

FIG. 6 is a flowchart for a malicious operation detection process performed by a network controller according to one or more embodiments. The process of FIG. 6 can be performed by, for example, a processor 116 of network controller 112 in FIG. 1 executing global detection module 30.

In block 602, the network controller receives cache access information from a plurality of nodes for respective shared caches of the nodes that form a distributed cache. The received cache access information can include, for example, indications of cache misses for the shared caches, indications of page faults for the shared caches, and indications of branch prediction misses for loading data into the shared caches. This information may be stored by the processor as global cache access information 32 in FIG. 1 and may relate processes with a process identifier to the metrics for the different processes accessing one or more shared caches, similar to the example of cache access information 20 in FIG. 2. However, unlike cache access information 20 in FIG. 2, the global cache access information at the network controller can correlate and combine the cache access information for a single process attempting to access different shared caches at different nodes in the network. For example, a particular process such as process C in FIG. 2 may also have attempted to access portions of one or more additional shared caches that were not mapped to the process, resulting in page faults at other nodes for other shared caches. This collection of cache performance metrics from multiple nodes can further help in identifying processes that are performing malicious memory operations throughout the distributed cache, such as when the attacks are spread out or distributed throughout the cache.

In block 604, the network controller receives data logs from one or more nodes of the plurality of nodes for their shared caches. As discussed above, some nodes may identify a process as being suspicious based on the collected cache access information and begin to log the data being accessed by the suspicious process. In other implementations, the node may log all of the data being accessed in the shared cache until reaching a limit before sending the logged data to the network controller. In some cases, the nodes may only send the logged data if requested by the network controller or if the collected cache access information equals or exceeds a threshold value.

In block 606, the network controller associates one or more access of the shared cache by processes with a privilege for the process to access the data. In some implementations, the network controller may also store a cache directory that can include the access privileges for different processes to different data in the distributed cache.

In block 608, the network controller analyzes at least one of the received cache access information, logged data, and process privileges to identify malicious operations in the distributed cache. The network controller may identify processes that have accessed or attempted to access one or more of the shared caches without the proper permissions (i.e., privileges) or have written null data (i.e., erasing data) to the shared cache, for example. In some implementations, the network controller may first analyze the cache access information to identify suspicious processes and then examine the data that has been logged for the accesses by such processes, or compare the privileges for the process to the data that was attempted to be accessed by the process in one or more of the shared caches.

Those of ordinary skill in the art will appreciate with reference to the present disclosure that the blocks for the malicious operation detection process of FIG. 6 may differ in other implementations. For example, the network controller may receive the cache access information in block 602 at the same time or after receiving the logged data in block 604. As another example variation, the receipt of logged data in block 604 or the association of privileges in block 606 may be omitted in some implementations.

As discussed above, the foregoing use of an in-kernel collection of cache access information at each node providing a shared cache for the distributed cache can improve the detection of malicious operations in the distributed cache and is scalable to accommodate changes in the distributed cache, such as the addition of more nodes. The use of in-kernel detection of malicious operations at the nodes can also take advantage of performance tools that may already be part of the kernel and can provide a quicker detection of malicious operations, as compared to applications that run in a user space. Furthermore, the accumulation of cache access information from throughout the distributed cache at a centralized network controller can improve the detection of malicious operations that may be spread throughout the distributed cache and not as easily detected at any one node.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A node, comprising:

a memory configured to be used, at least in part, as a shared cache in a distributed cache;

a network interface configured to communicate with one or more other nodes in a network, the one or more other nodes each configured to provide a respective shared cache for the distributed cache; and at least one processor configured, individually or in combination, to:

execute a kernel of an Operating System (OS) configured to allocate resources of the node;

collect, using the kernel, cache access information for the shared cache for identifying malicious operations in the distributed cache, wherein the shared cache is accessed by at least one other node;

identify one or more processes accessing the shared cache by respective process identifiers based on a socket number for a process and a Media Access Control (MAC) address of a different network interface for an executing node that executes the process, wherein the different network interface for the executing node is configured to communicate with the network interface of the node via the network; and send, to a network controller to identify malicious operations in the distributed cache, at least one of:

the collected cache access information including at least one process identifier, data logged from the shared cache that was accessed by the one or more processes, and one or more access privileges of the one or more processes to data in the shared cache, wherein the network controller is configured to control at least one of coherency of data stored in the distributed cache and access to the distributed cache by the node and the one or more other nodes.

2. The node of claim 1, wherein the kernel is further configured to collect the cache access information by executing an extended Berkeley Packet Filter (eBPF) program.

3. The node of claim 1, wherein the collected cache access information further includes at least one of an indication of cache misses for the shared cache, an indication of branch prediction misses for the shared cache, and an indication of page faults for the shared cache.

4. The node of claim 3, wherein the at least one processor is further configured, individually or in combination, to use the kernel to determine whether at least one of the indication of cache misses, the indication of page faults, and the indication of branch prediction misses equal or exceed a threshold value.

5. The node of claim 1, wherein the at least one processor is further configured, individually or in combination, to use the kernel to identify processes causing at least one of cache misses for the shared cache, page faults for the shared cache, and branch prediction misses for the shared cache.

6. The node of claim 1, wherein the at least one processor is further configured, individually or in combination, to collect the cache access information in a kernel space of the OS.

7. The node of claim 1, wherein the at least one processor is further configured, individually or in combination, to use the kernel to perform system call traces of different processes accessing the shared cache.

8. The node of claim 1, wherein the at least one processor is further configured, individually or in combination, to log at least one of data that is written in the shared cache and data that is read from the shared cache.

9. The node of claim 1, wherein the at least one processor is further configured, individually or in combination, to:

analyze at least one of the collected cache access information, data logged from the shared cache that was accessed by a particular process, and at least one access privilege of the particular process; and identify a malicious operation in the shared cache based on the analysis.

10. The node of claim 1, wherein the at least one processor is further configured, individually or in combination, to use a cache directory to associate one or more accesses or attempted accesses by a particular process with at least one access privilege of the particular process to access at least one address or namespace for particular data.

11. The node of claim 1, wherein the network controller is a Software Defined Networking (SDN) controller.

12. A method, comprising:

executing a kernel of an Operating System (OS) configured to allocate resources of a node;

creating a shared cache in a memory of the node, wherein the shared cache forms part of a distributed cache including respective shared caches stored at other nodes on a network;

using the kernel to collect cache access information for the shared cache for identifying malicious operations in the distributed cache, wherein the shared cache is accessed by at least one other node;

identifying one or more processes accessing the shared cache by respective process identifiers based on a socket number for a process and a Media Access Control (MAC) address of a different network interface for an executing node that executes the process, wherein the different network interface for the executing node is configured to communicate with a network interface of the node via the network; and sending, from the node to a network controller to identify malicious operations in the distributed cache, at least one of:

the collected cache access information including at least one process identifier, data logged from the shared cache that was accessed by the one or more processes, and one or more access privileges of the one or more processes to data in the shared cache, wherein the network controller is configured to control at least one of coherency of data stored in the distributed cache and access to the distributed cache by the node and the other nodes.

13. The method of claim 12, wherein the cache access information is collected by executing an extended Berkeley Packet Filter (eBPF) program.

14. The method of claim 12, wherein the collected cache access information includes at least one of an indication of cache misses for the shared cache, an indication of page faults for the shared cache, and an indication of branch prediction misses for the shared cache.

15. The method of claim 14, further comprising using the kernel to determine whether at least one of the indication of cache misses, the indication of page faults, and the indication of branch prediction misses equal or exceed a threshold value.

16. The method of claim 12, further comprising using the kernel to identify processes causing at least one of cache misses for the shared cache, page faults for the shared cache, and branch prediction misses for the shared cache.

17. The method of claim 12, wherein the collected cache access information is stored in a kernel space of the OS.

18. The method of claim 12, further comprising comparing an operation performed or attempted by a process to at least one access privilege for the process.

19. The method of claim 18, wherein the at least one access privilege of the process includes one of a shared status where multiple processes or applications are authorized to read particular data, an exclusive status where the process is authorized to modify the particular data, or a read only status where the process is authorized to read the particular data.

20. The method of claim 12, further comprising:

identifying, based on the collected cache access information, a suspicious process attempting to access the shared cache; and based on the identification of the suspicious process, logging data accessed by the suspicious process in the shared cache.

21. A network controller, comprising:

a network interface configured to communicate with a plurality of nodes in a network, wherein each node of the plurality of nodes is configured to provide a respective shared cache for a distributed cache;

means for receiving from the plurality of nodes, via the network interface, at least one of cache access information associated with one or more processes attempting to access the respective shared caches provided by the plurality of nodes, data logged from the respective shared caches that was accessed by the one or more processes, and one or more access privileges of the one or more processes, wherein:

at least one of the respective shared caches is accessed by at least one other node, and the one or more processes are identified by respective process identifiers based on a socket number for a process and a Media Access Control (MAC) address of a different network interface for an executing node that executes the process, wherein the different network interface for the executing node is configured to communicate with the network interface via the network;

means for identifying malicious operations in the distributed cache based on the received at least one of cache access information for the respective shared caches, data logged from the respective shared caches that was accessed by the one or more processes, and the one or more access privileges of the one or more processes; and means for controlling at least one of coherency of data stored in the distributed cache and access to the distributed cache by the plurality of nodes.

* * * * *